UNITED STATES PATENT OFFICE 2,563,856

DEFOAMING AGENT FOR PULP AND PAPER STOCK

Earl P. McGinn, Verona, N. J., assignor to Nopco Chemical Company, a corporation of New Jersey No Drawing. Application October 12, 1945, Serial No. 622,089

5 Claims. (Cl. 252—358)

The present invention relates to defoaming and to the prevention of foam during paper manufacture and an improved defoaming agent for paper stock. More particularly, the present invention relates to an improved composition and process for destroying and/or preventing foam, particularly during the manufacture of paper.

In U. S. Patent No. 2,304,304 granted December 8, 1942, there is disclosed a foam destroying composition comprising essentially a wax, preferably a mineral wax and a partial glyceride of a higher fatty acid. This composition is especially suitable for combination with a suspension of fibrous material and is effective to inhibit foam production during the various stages of paper manufacture.

Although this composition has proven commercially successful, it has been discovered in accordance with the present invention that the addition of an alkali metal soap of ricinoleic acid to a composition otherwise in general similar to that described in the aforementioned patent results in a greatly improved defoaming agent.

It is to be noted that ricinoleic acid soaps are far superior in a composition of this type than similar acid soaps i. e. oleic or stearic acid soaps.

It is one of the objects of the present invention, therefore, to provide a novel antifoaming composition especially suitable for preventing and destroying foam in a paper pulp or fibrous material suspension.

Another object of the present invention is to provide a novel defoaming agent including a mineral wax, a small amount of an alkali metal soap of ricinoleic acid and a partial ester of a polyhydric alcohol and a higher fatty acid having at least 16 carbon atoms.

A third object of the present invention is to provide a novel process for defoaming paper stock which comprises adding to the beater or other paper-making machine a small amount of the aforementioned defoaming composition.

Other objects and advantages of the present invention will become apparent from the subsequent description and claims.

In general, the composition of the present invention includes a mineral wax such as scale wax, although other mineral waxes, paraffins, microcrystalline wax, etc. may be used. Preferably, this wax is present in the original paste-like composition as prepared for shipment in the proportion of 10–20% of the total composition by weight. The composition may also contain a small amount of other waxes which serve to modify the nature of the mineral wax. Such a wax is candelilla wax, which has a substantially higher melting point.

In addition, there is formed in the composition during compounding thereof, a small amount of a soap of ricinoleic acid with an alkali metal. Such soap is present preferably in an amount equivalent to 4 to 7% of the composition. Any alkali metal soaps of ricinoleic acid or castor oil are suitable as, for example, sodium or potassium soaps.

The composition also contains from 5 to 20% of a partial ester of a polyhydric alcohol and a higher fatty acid. This higher fatty acid is preferably one having at least 16 carbon atoms and from 16 to 22 carbon atoms are suitable. The fatty acid may be straight chain or branch chain and may be saturated, hydroxylated, etc. The expression "partial ester" is used herein to connote an ester of a polyhydric alcohol in which at least one of the hydroxyl groups remains free or unesterified. Suitable compositions of this type are glyceryl monooleate, ethylene glycol monostearate, ethylene glycol monooleate, diethylene glycol monostearate, diethylene glycol monooleate and mono esters of fatty acids with polyhydroxy alcohols such as sorbitol, mannitol, etc. The balance of the composition is water, the amount being sufficient to produce a paste most satisfactory for shipping purposes.

In producing the composition of the present invention the wax and partial ester of a polyhydroxy alcohol and fatty acid are first melted together. The ricinoleic or castor fatty acid is then added and mixed thoroughly. Sufficient caustic soda is then added to saponify the ricinoleic acid and mixing is continued until the product becomes clear and homogeneous. The temperature during the foregoing should be kept as low as possible while maintaining the same sufficiently high to retain the reaction mass molten. Thereafter, water is added in quantity to produce a homogeneous paste when cool. The water preferably is added at a temperature of from 40° to 60° C.

The paste produced in accordance with the foregoing is usually diluted to form an emulsion having from 1 to 5% solids. This diluted emulsion may be added as needed to a paper-making machine such as a Fourdrinier or other machine and will be found to effectively inhibit the formation of foam. In general the diluted emulsion is added at such a rate that there is present in the stock from 0.5 to 3.0 parts of solid material to each million parts of stock suspension or from .01 to .2% of solids as compared to dry fiber weight.

The following specific example serves to illustrate but is not intended to limit the present invention.

Example 20 parts of scale wax, 2 parts of candelilla wax and 15 parts glyceryl monostearate were melted together and mixed. 5 parts of castor fatty acid were then added and thoroughly mixed. 2.3 parts of 23.5% sodium hydroxide solution were then added and mixing continued until the product became clear and homogeneous. 55.5 parts of water at 40° to 60° C. were then added and the whole mass stirred. When the mass had cooled to 40° C., 0.2 part of formaldehyde was then added and mixed in. A white homogeneous paste was produced which when properly diluted was an excellent defoaming agent for paper stocks.

Having described my invention, what I claim as new and desire to secure by Letters Patent is:

1. A defoaming agent for pulp and paper stock comprising a water emulsion made up of from about 10 parts to about 20 parts by weight of a mineral wax, from about 4 parts to about 7 parts by weight of an alkali metal soap of ricinoleic acid selected from the group consisting of the sodium soap and the potassium soap of ricinoleic acid, and from about 5 parts to about 20 parts by weight of a mono ester of a polyhydric alcohol and a fatty acid having from 16 to 22 carbon atoms, the balance of the emulsion being substantially all water and the amount of water in the emulsion not exceeding about 99% of the emulsion.

2. A defoaming agent for pulp and paper stock comprising a water emulsion made up of from about 10 parts to about 20 parts by weight of a mineral wax, from about 4 parts to about 7 parts by weight of sodium ricinoleate, and from about 5 parts to about 20 parts by weight of a mono ester of a polyhydric alcohol and a fatty acid having from 16 to 22 carbon atoms, the balance of the emulsion being substantialy all water and the amount of water in the emulsion not exceeding about 99% of the emulsion.

3. A defoaming agent for pulp and paper stock comprising a water emulsion made up of from about 10% to about 20% by weight of a mineral wax, from about 4% to about 7% by weight of an alkali metal soap of ricinoleic acid selected from the group consisting of the sodium soap and the potassium soap of ricinoleic acid, and from about 5% to about 20% by weight of a mono ester of a polyhydric alcohol and a fatty acid having from 16 to 22 carbon atoms, the balance of the emulsion being substantially all water.

4. A defoaming agent for pulp and paper stock comprising a water emulsion made up of from about 10% to about 20% by weight of a mineral wax, from about 4% to about 7% by weight of a potassium soap of ricinoleic acid, and from about 5% to about 20% by weight of a mono ester of a polyhydric alcohol and a fatty acid having from 16 to 22 carbon atoms, the balance of the emulsion being substantially all water.

5. A defoaming agent for pulp and paper stock comprising a water emulsion made up of from about 20% by weight of scale wax, about 2% by weight of candelilla wax, about 15% by weight of glyceryl monostearate, and the reaction product of about 5% by weight of castor fatty acid and about 2.3% by weight of about 23.5% sodium hydroxide solution, the balance of the emulsion being substantially all water.

EARL P. McGINN.

REFERENCES CITED

The following references are of record in the file of this patent:

UNITED STATES PATENTS

| Number | Name | Date |
|---|---|---|
| 1,591,725 | Mumford | July 6, 1926 |
| 1,957,513 | Wolfson | May 8, 1934 |
| 2,023,755 | Weihe | Dec. 10, 1935 |
| 2,052,164 | Buc | Aug. 25, 1936 |
| 2,298,465 | Clapsadle | Oct. 13, 1942 |
| 2,304,304 | Fritz | Dec. 8, 1942 |
| 2,304,805 | Denman | Dec. 15, 1942 |
| 2,346,928 | Lighthipe | Apr. 18, 1944 |
| 2,347,178 | Fritz | Apr. 25, 1944 |
| 2,349,585 | Bond | May 23, 1944 |
| 2,390,212 | Fritz | Dec. 4, 1945 |
| 2,423,214 | Welles | July 1, 1947 |

OTHER REFERENCES

Manufacture of Pulp and Paper, 3rd ed., vol. 5, sec. 1, p. 101, published by McGraw-Hill Book Co.

Modern Papermaking by Clapperton et al., 1st ed., published by Blackwell, Oxford, England (1929), p. 195.

Chemistry of Pulp and Papermaking, 3rd ed., by Sutermeister, published by John Wiley and Sons (1941), pp. 389 and 390.